(12) United States Patent
Wyman et al.

(10) Patent No.: US 8,928,808 B2
(45) Date of Patent: Jan. 6, 2015

(54) SEAMLESS TRANSITION BETWEEN INTERLACED AND PROGRESSIVE VIDEO PROFILES IN AN ABR SYSTEM

(71) Applicant: Broadcom Corporation, Irvine, CA (US)

(72) Inventors: Richard Hayden Wyman, Sunnyvale, CA (US); Jaewon Shin, Mountain View, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 13/913,224

(22) Filed: Jun. 7, 2013

(65) Prior Publication Data
US 2014/0347558 A1   Nov. 27, 2014

Related U.S. Application Data

(60) Provisional application No. 61/827,162, filed on May 24, 2013.

(51) Int. Cl.
*H04N 7/01* (2006.01)

(52) U.S. Cl.
CPC ..................... *H04N 7/012* (2013.01)
USPC ....................................... 348/448

(58) Field of Classification Search
USPC .......................... 348/448, 446, 458, 459, 441
See application file for complete search history.

(56) References Cited

U.S. PATENT DOCUMENTS

| | | | | |
|---|---|---|---|---|
| 5,497,199 A * | 3/1996 | Asada et al. | ................... | 348/446 |
| 5,610,661 A * | 3/1997 | Bhatt | ............................. | 348/446 |
| 6,055,018 A * | 4/2000 | Swan | ............................. | 348/448 |
| 6,888,530 B1 * | 5/2005 | Berbecel | ....................... | 345/103 |
| 6,897,903 B1 * | 5/2005 | Hu | ................................. | 348/700 |
| 7,236,204 B2 * | 6/2007 | Perlman | ........................ | 348/448 |
| 7,349,026 B2 * | 3/2008 | Wyman et al. | ................ | 348/441 |
| 7,349,029 B1 * | 3/2008 | Chou | ............................. | 348/448 |
| 7,355,651 B2 * | 4/2008 | Wyman et al. | ................ | 348/452 |
| 7,453,518 B2 * | 11/2008 | Kimoto | ......................... | 348/448 |
| 7,483,077 B2 * | 1/2009 | Wyman et al. | ................ | 348/452 |
| 7,586,546 B2 * | 9/2009 | Lee et al. | ....................... | 348/625 |
| 7,630,870 B2 * | 12/2009 | Chen et al. | ........................ | 703/6 |
| 8,629,937 B1 * | 1/2014 | Zhou | ............................. | 348/452 |
| 8,675,132 B2 * | 3/2014 | Znamenskiy et al. | ......... | 348/558 |
| 2003/0122961 A1 * | 7/2003 | Li | .................................. | 348/448 |
| 2005/0041145 A1 * | 2/2005 | Hatti et al. | ..................... | 348/448 |

* cited by examiner

*Primary Examiner* — Paulos M Natnael
(74) *Attorney, Agent, or Firm* — McDermott Will & Emery LLP

(57) ABSTRACT

A method for seamless transition between interlaced and progressive video profiles may include receiving at a video feeder a stream of video signals for displaying on a display device. The stream of video signals may include segments of one of interlaced fields or progressive video frames. During an interlaced stream, the interlaced fields may be directed to a deinterlacer, and an output of the deinterlacer may be directed to the display device. The output of the deinterlacer may be determined based on previously received interlaced fields from the video feeder. During a transition to a progressive stream, the progressive video frames may be directed to a frame store, and the output of the deinterlacer may be directed to the display device. During a progressive stream, the progressive video frames may be directed to the frame store, and previously stored frames may be directed to the display device.

20 Claims, 6 Drawing Sheets

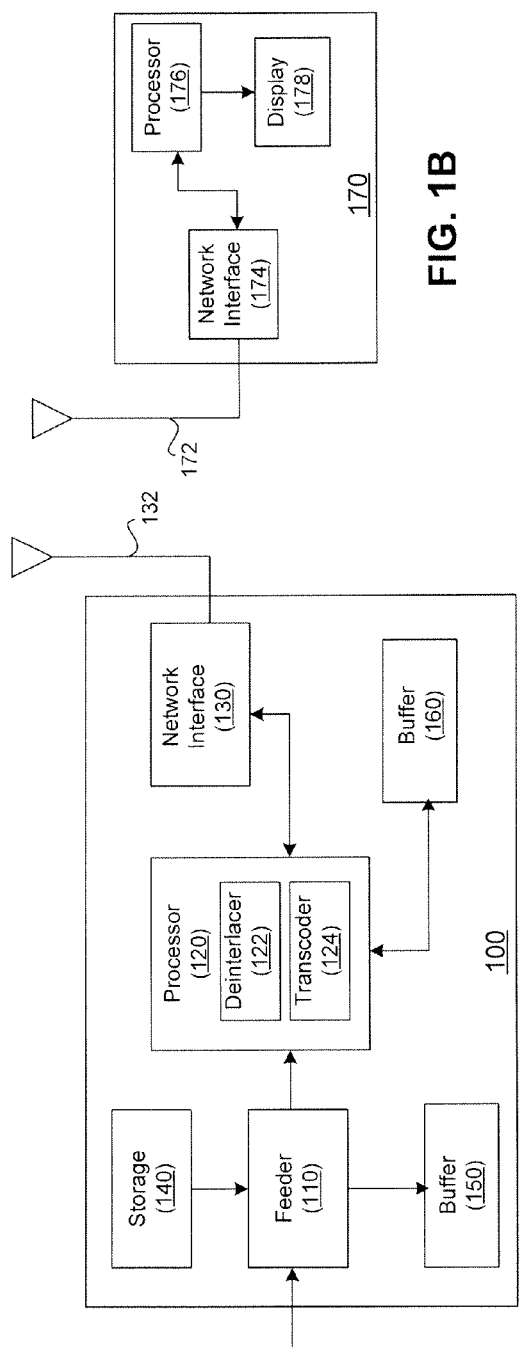
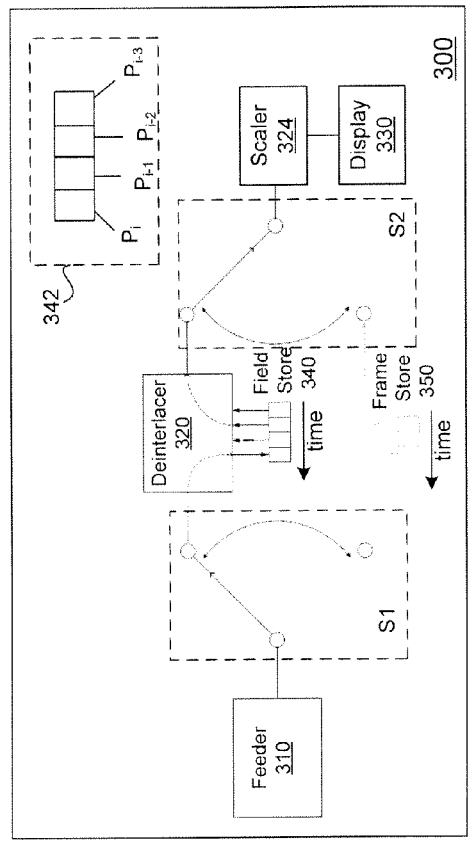
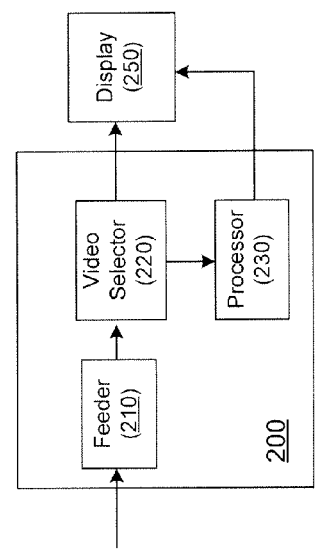
FIG. 1A
FIG. 1B
FIG. 2
FIG. 3

US 8,928,808 B2

SEAMLESS TRANSITION BETWEEN INTERLACED AND PROGRESSIVE VIDEO PROFILES IN AN ABR SYSTEM

CROSS-REFERENCE TO RELATED APPLICATIONS

This application claims the benefit of priority under 35 U.S.C. §119 from U.S. Provisional Patent Application 61/827,162 filed May 24, 2013, which is incorporated herein by reference in its entirety.

TECHNICAL FIELD

The present description relates generally to signal processing, and more particularly, but not exclusively, to seamless transition between interlaced and progressive video profiles in an adaptive bit rate (ABR) system.

BACKGROUND

ABR streaming is a technique used in streaming multimedia over communication networks, e.g. Internet. Some video streaming technologies may utilize streaming protocols such as Real Time Protocol (RTP) with Real Time Streaming Protocol (RTSP), ABR streaming technologies are almost exclusively based on Hyper Text Transport Protocol (HTTP) and designed to work efficiently over large networks that support HTTP, such as the Internet.

ABR streaming may work by detecting a user's bandwidth and CPU capacity in real time and adjusting the quality of a video stream accordingly. The ABR streaming may require the use of an encoder which can encode a single source video at multiple bit rates to generate different bit rate streams. Each of the different bit rate streams may be segmented into small multi-second parts. The client (e.g., the streaming client or the player client) is made aware of the available streams at differing bit rates, as well as segments of the streams by a manifest file. The client may switch between streaming the different encodings depending on available resources. In general, this may result in very little buffering, fast start time and a good experience for both high-end and low-end connections as well as connections whose quality varies over time.

BRIEF DESCRIPTION OF THE DRAWINGS

Certain features of the subject technology are set forth in the appended claims. However, for purpose of explanation, several embodiments of the subject technology are set forth in the following figures.

FIGS. 1A-1B illustrate examples of an adaptive bit rate (ABR) system for seamless transition between interlaced and progressive video profiles and a client device, in accordance with one or more implementations.

FIG. 2 illustrates an example of a device for seamless transition between interlaced and progressive video profiles in an ABR system, in accordance with one or more implementations.

FIG. 3 illustrates an example of a device for seamless transition between interlaced and progressive video profiles in an interlaced source steady state, in accordance with one or more implementations.

DETAILED DESCRIPTION

Figure 4A:
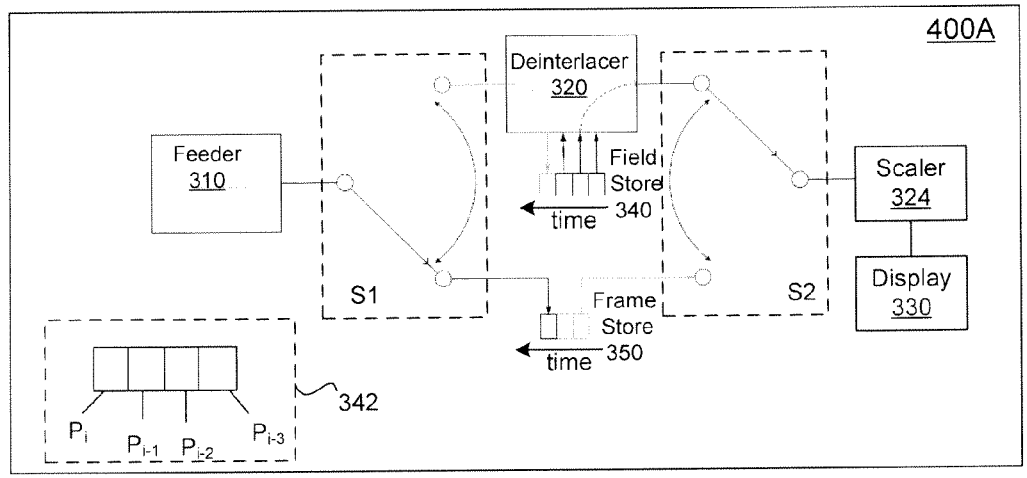
FIGS. 4A-4B illustrate examples of the device of FIG. 3 in interlaced-to-progressive transition states, in accordance with one or more implementations

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using one or more implementations. In one or more instances, well-known structures and components are shown in block diagram form in order to avoid obscuring the concepts of the subject technology.

FIGS. 1A-1B illustrate examples of an adaptive bit rate (ABR) system 100 for seamless transition between interlaced and progressive video profiles, and a client device 170, in accordance with one or more implementations of the subject technology. The ABR system 100 may include a feeder (e.g., a video feeder) 110, a processor 120, a network interface 130, a storage device (e.g., hard disk, Flash memory, DRAM, etc.) 140, a number of buffers such as buffers 150 and 160 (e.g., frame stores or field stores). The ABR server 100 may include other components and modules not shown here for simplicity. The processor 120 may include a number of hardware (HW) core processors, for example a deinterlacer 122 and a transcoder 124. The feeder 110 may feed a stream of video to the processor 120. The stream of video may be provided by an external source (e.g., a content provider) or the storage device 140.

In one or more implementations of the subject technology, the ABR system 100 may include, but is not limited to, a remote server, a home or enterprise gateway, or a set-top-box (STB). The ABR system 100 may broadcast an ABR stream via the network interface 130 and the antenna 132 to a number of client devices (e.g., ABR client devices) such as the client device 170, which may include a STB, a television set, a computer, an handheld device (e.g., a mobile phone, a laptop, a tablet, etc.). In some aspects, the client device 170 may include an antenna 172, a network interface 174, a processor 176, and a display 178. The processor 176 may include a decoder, a deinterlacer, and other HW cores. The client device 170 may include other components and modules not shown here for simplicity.

ABR video sources may be split into short segments (e.g., chunks of typically of 2 to 10 seconds duration each) and encoded at several bitrate/quality options, which may be advertised to ABR clients. For example, for the next segment to be fetched from the ABR server 100, the client device 170 may make an assessment of the bitrate available (e.g., observed) on a local network and the available processing (CPU) power and may select one of the options of bitrates advertised by the server 100. In many ABR systems, all the bitrate/quality options are progressive video. If the master video source happened to have been interlaced, it can be deinterlaced (e.g., by deinterlacer 122) before each of the bitrate/quality options are prepared.

In a video distribution system that supports both ABR video and traditional broadcast, it may be advantageous to convey the original master video source (which may be the highest quality available) as one of the available options from which the ABR client may select. If that master video source happens to be interlaced, it may be necessary for the ABR client to be able to seamlessly transition between interlaced and progressive segments. In order to deinterlace effectively, deinterlacers typically maintain a number of fields temporally beyond the particular one that is the basis for the current output frame. So, a high quality deinterlacer may maintain a pipeline of fields both temporally ahead of and behind the field that is the basis of the current output frame. In the steady state, this may be of no issue since the audio delay through the system can be set up to match the video delay through the deinterlacer. In the existing systems, however, the deinterlacer may need to be enabled and disabled, in the worst case, on each segments of 2-10 seconds. This may require providing a system that can match delay between the cases of the deinterlacer being present or not in order to maintain A/V sync. The A/V sync has to be achieved without either video or audio glitches being observable by a viewer. The subject technology allows seamless transition between interlaced and progressive video segments for ABR systems as described herein.

FIG. 2 illustrates an example of a device 200 for seamless transition between interlaced and progressive video profiles in an ABR system, in accordance with one or more implementations of the subject technology. The device 200 may include a feeder (e.g., video feeder) 210, a video selector 220, and a processor 230. The device 200 may include other components and modules not shown here for simplicity. The device 200 may provide interlaced video segments to a display device 250, which may include a deinterlacer. The stream of video provided by the feeder 210 may include both progressive and interlaced video segments (e.g., segments of interlaced fields). The device converts the progressive video segments to interlaced video segments. For example, when receiving segments of interlaced fields from the feeder 210, the video selector 220 may direct the interlaced fields to the display device 250, which include a deinterlacer.

The video selector 220, when receiving segments of progressive video frames, may direct the received segments of progressive video frames to the processor 230. At the processor 230, a selected group of lines of each progressive video frame that alternates between odd-numbered lines (e.g., forming a top (T)-field) and even-numbered lines (e.g., forming a bottom (B)-field) for successively received video frames, may be selected and sent to the display device 250. For example, for the first progressive frame, the T-field may be selected and for the next progressive frame, the B-field may be selected and sent to the display device 250.

FIG. 3 illustrates an example of the device 300 for seamless transition between interlaced and progressive video profiles in an interlaced source steady state, in accordance with one or more implementations of the subject technology. The device 300 may be a part of the ABR system 100 of FIG. 1A or the client device 170 of FIG. 1B. The device 300 may include a deinterlacer 320, a feeder (e.g., video feeder) 310, a scaler 324, a display 330, a first switch (e.g., video selector) S1, a second switch S2, a field store 340, and a frame store 350. The field store 340 and the frame store 350 each may include a buffer that can store a number of video fields or video frames, respectively. The feeder 310 may provide a stream of video signals including a number of video segments of one of progressive video frames (hereinafter "frames") or interlaced fields (hereinafter "fields").

In the device 300, two paths for video signals are available. The first path, through the deinterlacer 320, may handle segments of fields. The second path, through the frame store 350, may maintain an equivalent delay as introduced by the deinterlacer. The video selector S1 may route the interlaced fields to the deinterlacer path and the frames to the frame-store path. The second selector S2 may route deinterlaced frames from the deinterlacer 320 or frames from the frame store 350, to the scaler 324 and the display 330. The two video selectors S1 and S2 are independent and may be allowed to switch at different times. The state of the video selectors 51 and S2 shown in FIG. 3 depicts the steady state with an interlaced source. Fields are fed by the feeder 310 to the deinterlacer 320. The output of the deinterlacer 320 to the scaler 324 may be based on the field that was received from the video feeder two fields' ago. The scaler 324 may provide for keeping the output video dimensions consistent when the switch S2 is switched from one position to another. In an aspect, the output video may be desired to have a 720p (e.g., 1280×720 resolution) format. If the interlaced stream has a 1080i format and the progressive stream has a 480p (e.g., 720×480 resolution) format, the scaler 324 may scale down a 1080p (e.g., 1920× 1080 resolution) deinterlaced stream to the desired 720p format, and scale up the 480p progressive stream to the 720p format. If the deinterlaced or the progressive stream happened to match the desired video output (e.g., display) size, the scaler may just pass the routed video through with no modification. A larger view of the field store 340 is shown in the diagram 342, a field $P_{i-2}$ of which may form the base of the output frame of the deinterlacer 320, $P_{i-3}$ is a prior field, and $P_{i-1}$ and $P_i$ are fields that are received from the feeder 310 after the $P_{i-2}$ field. The deinterlacer 320 may use a temporal processing to form the output frame based on the available stored fields $P_{i-3}$ to $P_i$.

Figure 4B:
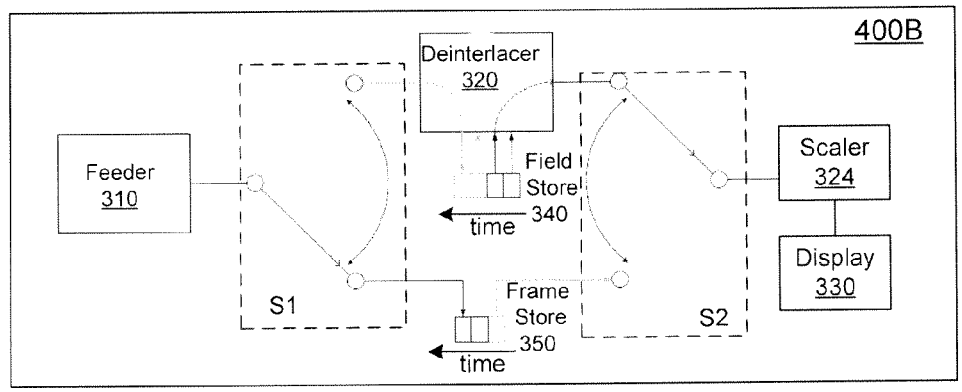

FIGS. 4A-4B illustrate examples of the device 300 of FIG. 3 in interlaced-to-progressive transition states, in accordance with one or more implementations of the subject technology. The devices 400A and 400B are similar to the device 300, except for the state of the video selectors S1 and S2. FIG. 4A depicts a first step of the interlaced-to-progressive transition that corresponds to an end of an interlaced segment and a start of a progressive segment being received from the feeder 310. On the first frame of the progressive segment, although the frame from the video feeder 310 is being fed to the frame-store 340, the video selector S2 may still retrieve the output frame from the deinterlacer 320. The deinterlacer 320 may no longer have a full complement of fields (e.g., $P_{i-3}$ to $P_i$) in its field store pipeline, as $P_i$ is missing. However, as an advantageous feature of the subject technology, the deinterlacer 320 can still produce an output frame based on the fields still present in its pipeline by using a spatial (e.g., non-temporal) processing, and send the output frame to the scaler 324 and the display device 330.

The next step of the interlaced-to-progressive transition, as shown in FIG. 4B, corresponds to receiving of the second progressive frame from the feeder 310 after the start of the interlaced-to-progressive transition. As shown in FIG. 4B, two frames have been stored in the frame-store 350, but another output frame is provided by the deinterlacer 320, using spatial processing from the previously stored fields (e.g., $P_{i-3}$ and $P_{i-2}$ of FIG. 4A) in the field store 340. The state of the video selectors S1 and S2 are similar to those in FIG. 4A.

Figure 5:
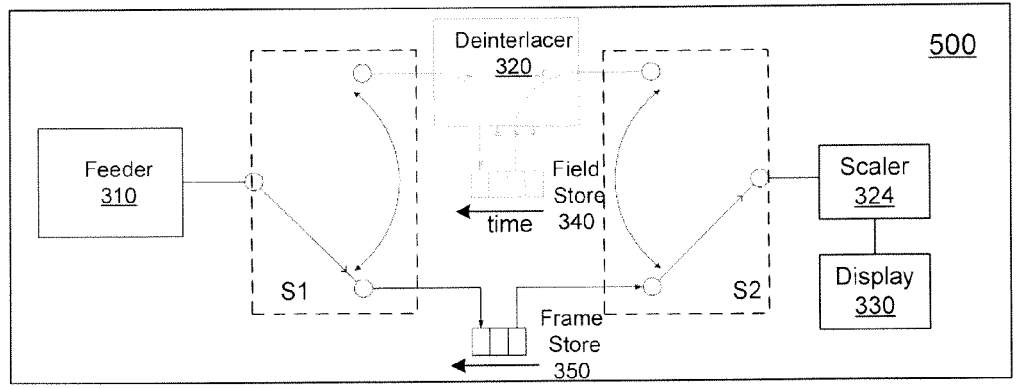
FIG. 5 illustrates an example of the device of FIG. 3 in a progressive steady state, in accordance with one or more implementations.

FIG. 5 illustrates an example of the device 300 of FIG. 3 in a progressive steady state, in accordance with one or more implementations of the subject technology. The device 500 is similar to the device 300, except for the state of the video selectors S1 and S2. In the FIG. 5, which depicts progressive steady state, the feeder 310 is providing progressive frames to the frame store 350 and the deinterlacer 320 and the field store 340 are temporarily inactive, while the video selector S2 has changed state (e.g., compared to FIG. 4B) to route the frames from the frame store 350 to the scaler 324 and the display device 330.

Figure 6A:
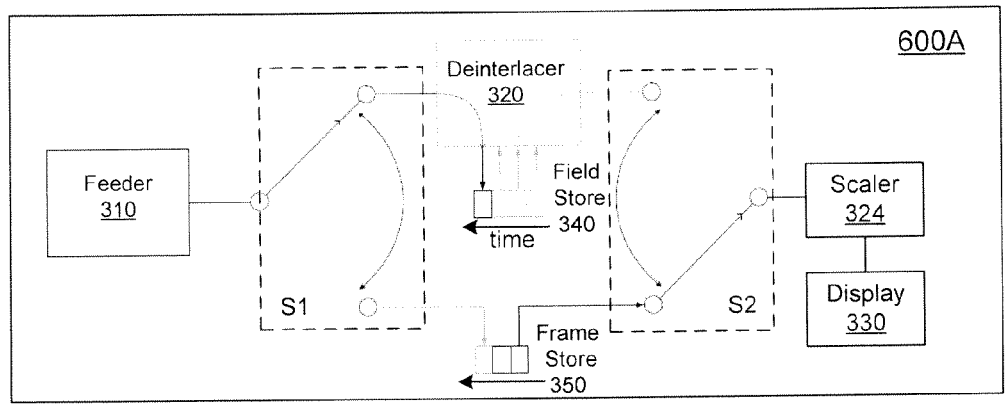
FIGS. 6A-6C illustrate examples of the device of FIG. 5 in progressive-to-interlaced transition states, in accordance with one or more implementations.
Figure 6B:
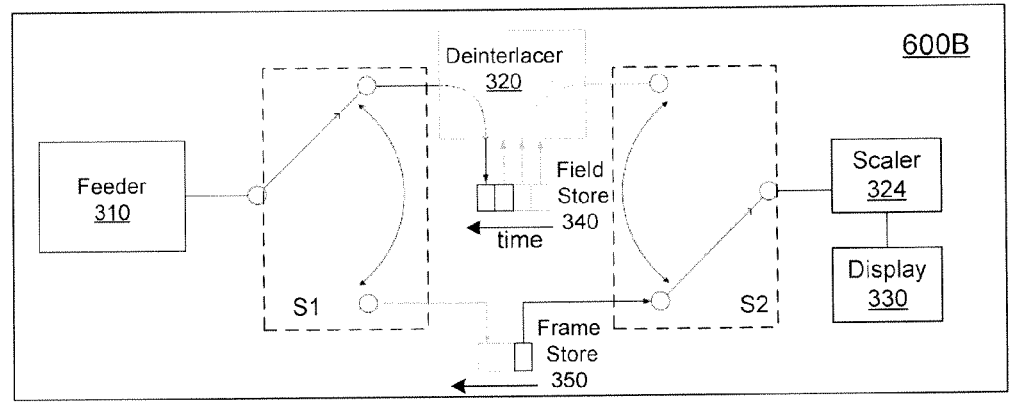
Figure 6C:
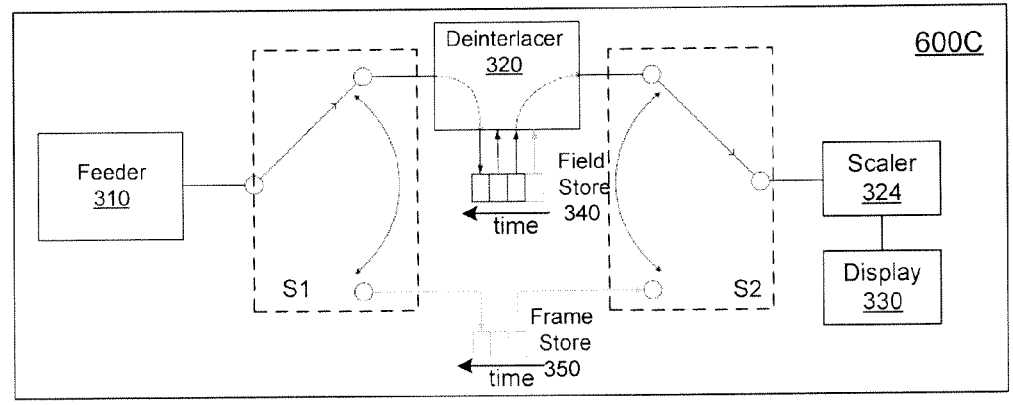

FIGS. 6A-6C illustrate examples of the device 500 of FIG. 5 in progressive-to-interlaced transition states, in accordance with one or more implementations of the subject technology. The devices 600A-600B are similar to the device 500, except for the state of the video selectors S1 and S2. FIG. 6A depicts a first step of the progressive-to-interlaced transition that corresponds to an end of a progressive segment and a start of an interlaced segment being received from the feeder 310. On the first field of the interlaced segment, although the video selector S1 has changed state (e.g., compared to FIG. 5) to route, through the deinterlacer 320, frames from the video feeder 310 to the field store 340, the video selector S2 may still retrieve the output frame from the frame store 350.

The next step of the progressive-to-interlaced transition, as shown in FIG. 6B, corresponds to receiving of the second interlaced field from the feeder 310 after the start of the progressive-to-interlaced transition. As shown in FIG. 6B, two fields (e.g., $P_i$ and $P_{i-1}$ of FIG. 4A) have been stored in the field store 340, and another output frame is provided by the video selector S2 from the frame store 350 to the scaler 324 and the display device 330. The state of the video selectors S1 and S2 are similar to those in FIG. 6A.

The last step of the progressive-to-interlaced transition, as shown in FIG. 6C, corresponds to receiving of the third interlaced field from the feeder 310 after the start of the progressive-to-interlaced transition. As shown in FIG. 6C, three fields (e.g., $P_i$, $P_{i-1}$, and $P_{i-2}$ of FIG. 4A) have been stored in the field store 340, and the deinterlacer 320 may produce the output frame for the scaler 324. In this step, the deinterlacer 320 again does not have a full complement of fields, and therefore may produce the output frame based on the available fields (e.g., $P_i$, $P_{i-1}$, and $P_{i-2}$) using spatial processing. From this point on, until another interlaced-to-progressive transition occurs, the steady state of FIG. 3 may continue.

Figure 7:
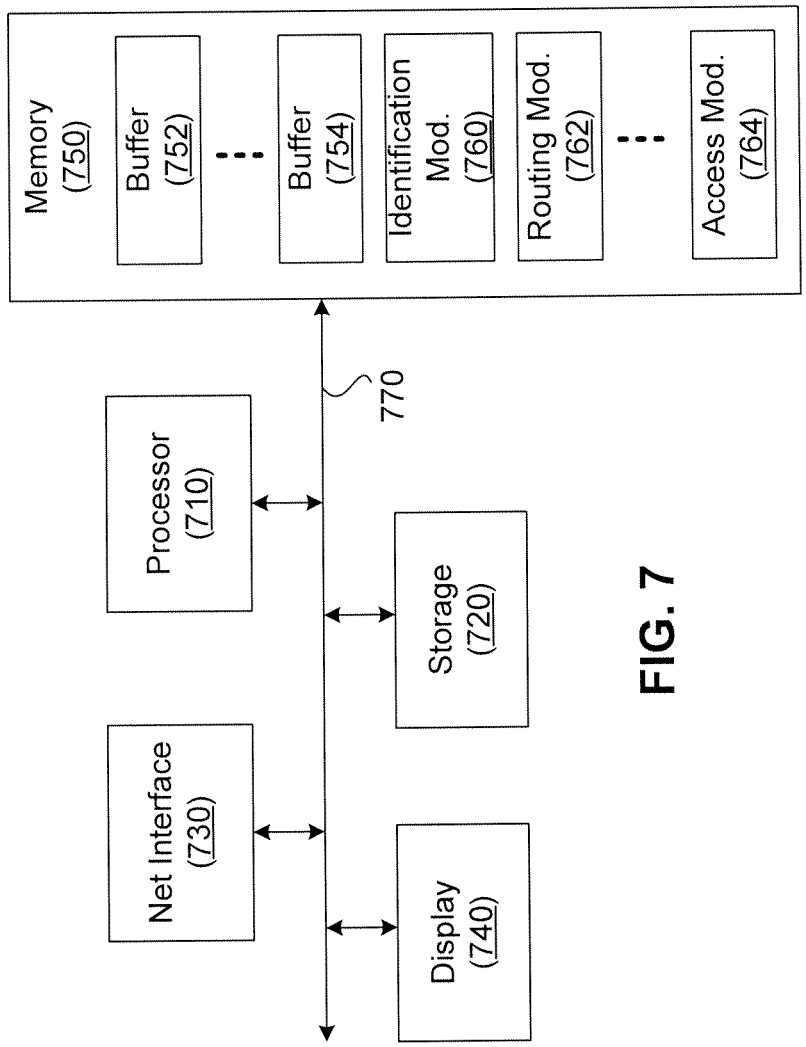
FIG. 7 illustrates an example of a system for seamless transition between interlaced and progressive video profiles, in accordance with one or more implementations.

FIG. 7 illustrates an example of a system 700 for seamless transition between interlaced and progressive video profiles, in accordance with one or more implementations of the subject technology. The system 700 may include an ABR server, a gateway (e.g., a home or enterprise gateway), or a STB. The system 700 may include a processor 710, a storage device 720, a network interface 730, a display device 740, and memory 750 coupled to one another via a bus 770. The system 700 may include other components and modules not shown here for simplicity. The storage device 720 may include a hard disk, flash memory, or other type of memory. The memory 750 may include a number of buffers (e.g., field store, frame store, etc.) such as buffers 752 and 754, a number of program modules such as an identification module 760, a routing module 762, and an access module 764. The processor 710 may include a number of HW core processors such as one or more deinterlacers, transcoders, scalers, and the like, and may execute the program modules stored in memory 750. The network interface 730 may be configured to communicate with one or more client devices (e.g., ABR clients).

In one or more embodiments of the subject technology, the system 700 may receive from a source (e.g., an external source or the storage device 720) a stream of video signals for displaying on the display device 740. The stream of video signals may include segments of one of interlaced fields or progressive video frames, which can be identified by the identification module 760. The system 700 may be able to perform the functionalities of the device 300 of FIG. 3, as described with respect to FIGS. 3, 4A-4B, 5, and 6A-6C, with the deinterlacer included in the processor 710 acting as the deinterlacer 320 of FIG. 3. Further the buffer 754 may store fields of the interlaced fields (e.g., similar to the field store 340 of FIG. 3) and the buffer 754 may store frames of the progressive frames (e.g., similar to the frame store 350 of FIG. 3). The access module 764 may provide access to the storage device 720 and buffers 752 and 754.

The routing module 762 may route the input fields and frames to the processor 710 and buffer 754 (e.g., as video selector S1 of FIG. 1 does for deinterlacing and storing a set of fields) or to the buffer 754 (e.g., for storing as a set of frames), respectively, as described with respect to FIGS. 3, 4A-4B, 5, and 6A-6C. The routing module 762 may further route (e.g., as the video selector S2 of FIG. 1 does) the deinterlaced output fields from the processor 710 and frames from the buffer 754 to the display device 740, as described with respect to FIGS. 3, 4A-4B, 5, and 6A-6C.

In one or more embodiments of the subject technology, the system 700 may receive from a source (e.g., an external source or the storage device 720) a stream of video signals for displaying on the display device 740, which may include a deinterlacer. The stream of video signals may include segments of one of interlaced fields or progressive video frames, which can be identified by the identification module 760. When receiving segments of interlaced fields, the routing module 762 may direct the interlaced fields to the deinterlacer that is included in the display device 740. However, when the identification module 760 identifies the received segments as progressive video frames, the routing module 762 may route the progressive video frames to the processor 710. At the processor 710, a selected group of lines of each progressive video frame that alternates between odd-numbered lines (e.g., forming a T-field) and even-numbered lines (e.g., forming a B-field) for successively received video frames, may be selected and sent to the display device 740. For example, for the first progressive frame, the T-field may be selected and for the next progressive frame, the B-field may be selected and sent to the display device 740.

Figure 8:
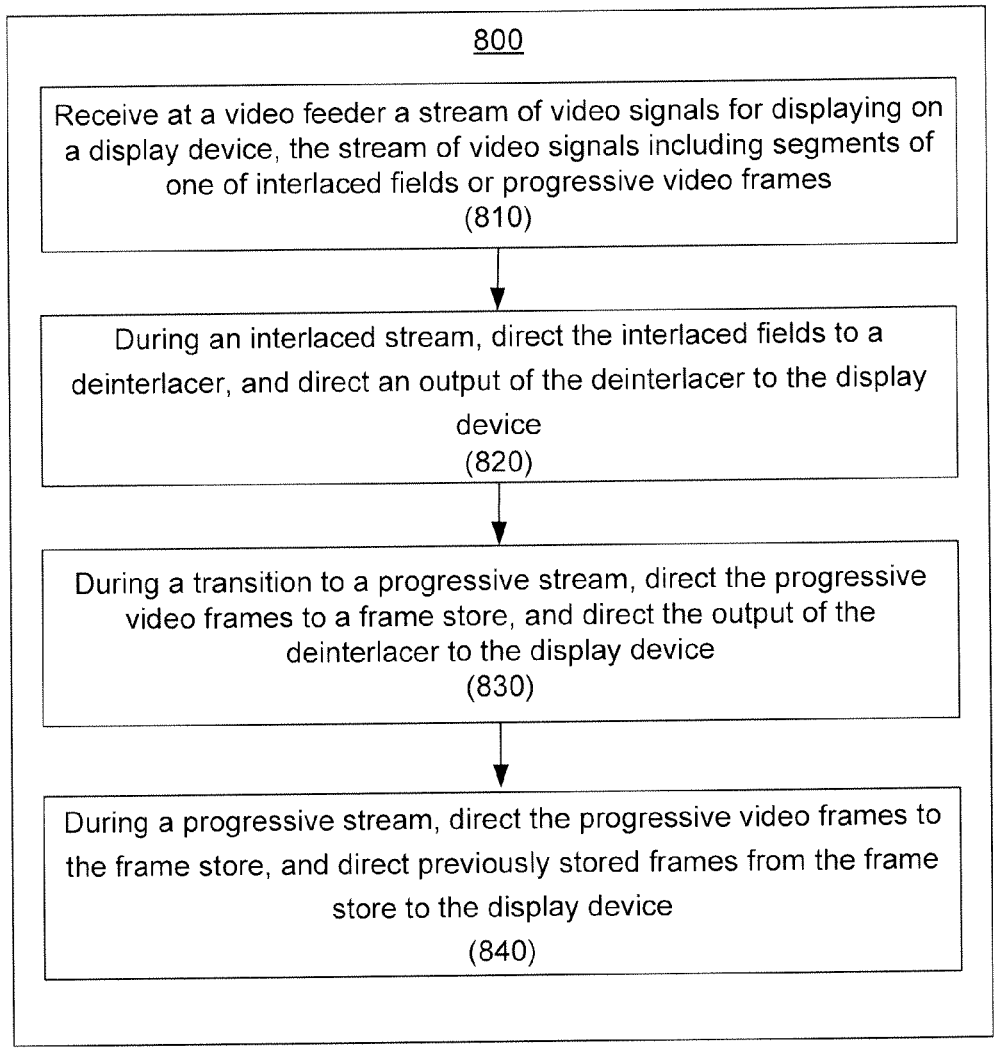
FIG. 8 illustrates an example of a method for seamless transition between interlaced and progressive video profiles, in accordance with one or more implementations.

FIG. 8 illustrates an example of a method 800 for seamless transition between interlaced and progressive video profiles, in accordance with one or more implementations of the subject technology. The method 800 may start at operation block 810, where a stream of video signals for displaying on a display device (e.g., 330 of FIG. 3) may be received, at a video feeder (e.g., 310 of FIG. 3). The stream of video signals may include segments of one of interlaced fields or progressive video frames. At operation block 820, during an interlaced stream (e.g., as depicted in FIG. 3), the interlaced fields may be directed to a deinterlacer (e.g., 320 of FIG. 3), and an output of the deinterlacer may be directed to the display device. The output of the deinterlacer may be determined based on previously received interlaced fields from the video feeder. At operation block 830, during a transition to a progressive stream (e.g., as depicted in FIGS. 4A-4B), the progressive video frames may be directed (e.g., using the switch S1 of FIG. 3) to a frame store (e.g., 350 of FIG. 3) and the output of the deinterlacer may be directed (e.g., using the switch S2 of FIG. 3) to the display device. At operation block 840, during a progressive stream (e.g., as depicted in FIG. 5), the progressive video frames may be directed to the frame store, and previously stored frames from the frame store may be directed to the display device.

Figure 9:
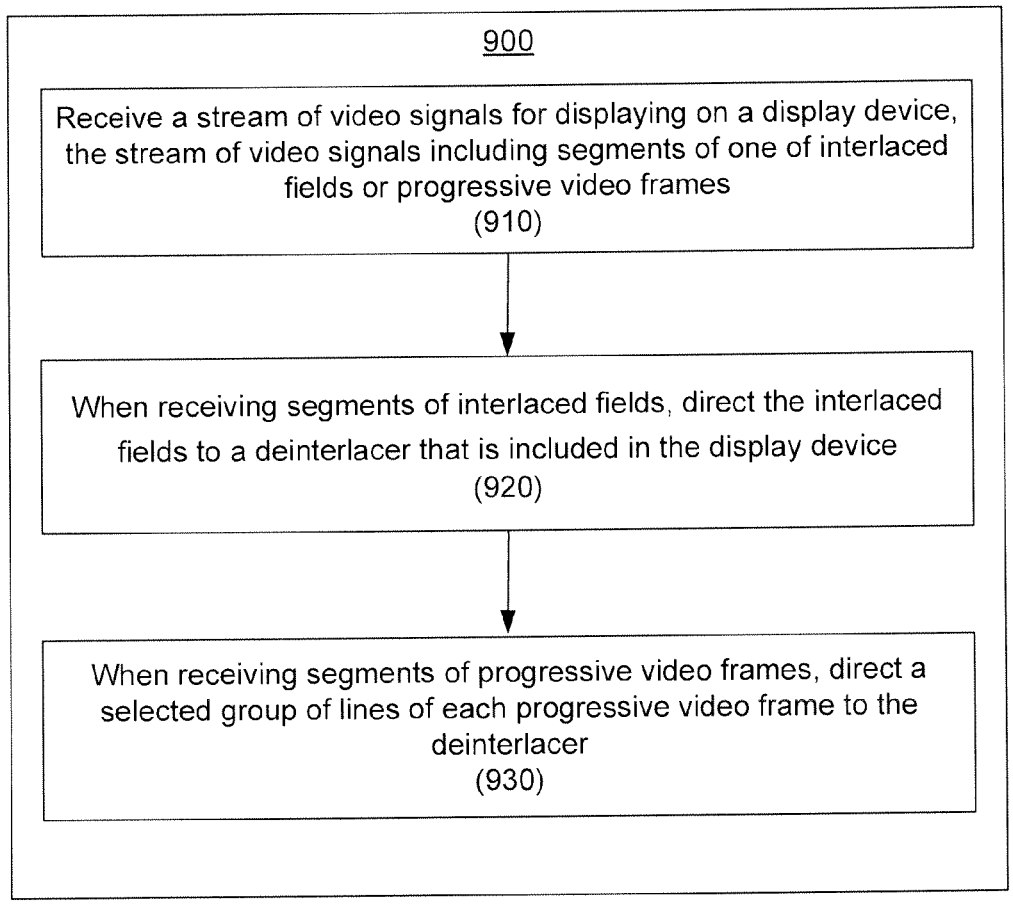
FIG. 9 illustrates an example of a method for seamless transition between interlaced and progressive video profiles, in accordance with one or more implementations.

FIG. 9 illustrates an example of a method 900 for seamless transition between interlaced and progressive video profiles, in accordance with one or more implementations of the subject technology. The method 900 may start at operation block 910, where a stream of video signals for displaying on a display device (e.g., 250 of FIG. 2) are received. The stream of video signals may include segments of one of interlaced fields or progressive video frames. At operation block 920, when receiving segments of interlaced fields, the interlaced fields may be directed to a deinterlacer that is included in the display device. An output of the deinterlacer may be displayed on the display device. At operation block 930, when receiving segments of progressive video frames, a selected group of lines of each progressive video frame may be directed to the deinterlacer (e.g., the deinterlacer included in 250 of FIG. 2). The selected group of lines may alternate between odd-numbered lines and even-numbered lines for successively received video frames.

The subject technology, as disclosed herein with respect to the above described FIGs., can maintain the same video delay when the source is interlaced or progressive. This means that the relative delay between video and audio is unaltered during the transitions so no adjustments to video or audio may be necessary in order to maintain A/V sync.

The subject technology may produce a single frame for display from each source picture, irrespective of the segments of the source of video stream being interlaced or progressive. This provides for smooth interlaced/progressive transitions. Other methods of trying to handle the transitions in and out of deinterlacing can result in pictures needing to be skipped and/or repeated.

Those of skill in the art would appreciate that the various illustrative blocks, modules, elements, components, and methods described herein may be implemented as electronic hardware, computer software, or combinations of both. To illustrate this interchangeability of hardware and software, various illustrative blocks, modules, elements, components, and methods have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as an "aspect" may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples of the disclosure. A phrase such an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as a "configuration" may refer to one or more configurations and vice versa.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method for seamless transition between interlaced and progressive video profiles, the method comprising:

receiving a stream of video signals, at a video feeder, for displaying on a single display device, the stream of video signals including an interlaced stream consisting of segments of interlaced fields or a progressive stream consisting of progressive video frames;

during the interlaced stream, directing the interlaced fields to a deinterlacer, and directing an output of the deinterlacer to the display device, the output of the deinterlacer being determined based on previously received interlaced fields from the video feeder;

during a transition of the stream of video signals from the interlaced stream to the progressive stream that corresponds to an end of an interlaced segment and a start of a progressive segment, achieving seamless transition by directing the progressive video frames to a frame store and directing the output of the deinterlacer to the single display device; and during a progressive stream, directing the progressive video frames to the frame store, and directing previously stored frames from the frame store to the single display device.

2. The method of claim 1, wherein the transition of the stream of video signals from the interlaced stream to the progressive stream comprises a period that one or more initial frames of a segment of video frames are received and directed to the frame store.

3. The method of claim 1, further comprising, directing, during a transition from the progressive stream to the interlaced stream, the interlaced fields to the deinterlacer, and directing previously stored frames from the frame store to the single display device.

4. The method of claim 3, wherein the transition from the progressive stream to the interlaced stream comprises a period that one or more initial interlaced fields of a segment of interlaced fields are received and directed to the frame store.

5. The method of claim 1, wherein directing the interlaced fields to a deinterlacer comprises storing the received interlaced fields in a field store.

6. The method of claim 5, wherein determining the output of the deinterlacer based on the previously received interlaced fields comprises at least one of a temporal or a spatial processing of the stored interlaced fields from the field store.

7. A method for seamless transition between interlaced and progressive video profiles, the method comprising:

receiving a stream of video signals from a feeder for displaying on a single display device, the stream of video signals including segments of one of interlaced fields or progressive video frames;

when receiving segments of interlaced fields from the feeder, directing using a video selector the interlaced fields to a deinterlacer that is included in the single display device;

when receiving segments of progressive video frames from the feeder, directing using the video selector, the segments of progressive video frames to a processor, and sending by the processor a selected group of lines of each progressive video frame to the single display device, wherein the selected group of lines alternates between odd-numbered lines and even-numbered lines for successively received video frames; and directing output signals of the deinterlacer to the single display device.

8. The method of claim 7, wherein directing output signals of the deinterlacer to the single display device comprises directing deinterlaced fields and deinterlaced selected group of lines of the progressive video frames to the single display device.

9. A device for providing seamless transition between interlaced and progressive video profiles, the device comprising:

a video feeder configured to receive a stream of video signals, the stream of video signals including an interlaced stream consisting of segments of interlaced fields or a progressive stream consisting of progressive video frames;

a deinterlacer configured to deinterlace the interlaced fields;

a display device configured to display the deinterlaced fields and the progressive video frames;

a first switch configured to direct:
the interlaced fields to the deinterlacer, during the interlaced stream;
the progressive video frames to a frame store, during a transition of the stream of video signals from the interlaced stream to the progressive stream that corresponds to an end of an interlaced segment and a start of a progressive segment, and during the progressive stream; and a second switch configured to direct to the display device:
an output of the deinterlacer, during an interlaced stream and during the transition of the stream of video signals from the interlaced stream to the progressive stream, the output of the deinterlacer being determined based on previously received interlaced fields from the video feeder by the deinterlacer; and
previously stored frames from the frame store, during a progressive stream.

10. The device of claim 9, wherein the transition to the progressive stream comprises a period that one or more initial frames of a segment of video frames are received by the first switch and directed to the frame store, and wherein the first and second switches comprise video selectors that are independent and are allowed to switch at different times.

11. The device of claim 9, wherein the first switch is further configured to direct, during a transition from the progressive stream to the interlaced stream, the interlaced fields to the deinterlacer, and wherein the second switch is further configured to direct previously stored frames from the frame store to the display device.

12. The device of claim 11, wherein the transition from the progressive stream to the interlaced stream comprises a period that one or more initial interlaced field of a segment of interlaced fields are received by the first switch and directed to the frame store.

13. The device of claim 9, wherein the deinterlacer is further configured to store the interlaced fields received from the first switch in a field store.

14. The device of claim 13, wherein the deinterlacer is further configured to determine the output of the deinterlacer based on the previously received interlaced fields by at least one of a temporal or a spatial processing of the stored interlaced fields from the field store.

15. A device for providing seamless transition between interlaced and progressive video profiles, the device comprising:

a video feeder configured to receive a stream of video signals including segments of one of interlaced fields or progressive video frames;

a video selector configured to:
receive the stream of video signals from the video feeder;
determine whether the received video signals comprise segments of interlaced fields or progressive video frames;
direct the interlaced fields to a client device, when the received video signals comprise segments of interlaced fields; and direct the progressive video frames to a processor, when the received video signals comprise segments of progressive video frames; and a processor to select a group of lines of each progressive video frame, and to direct the selected group of lines to a display device, wherein the selected group of lines alternates between odd-numbered lines and even-numbered lines for successively received video frames.

16. The device of claim 15, wherein the client device includes a deinterlacer.

17. An adaptive bit rate (ABR) server comprising:

memory configured to store one or more program modules;

one or more processors coupled to the memory and configured to execute the one or more modules to perform the following:

receiving a stream of video signals, at a video feeder, the stream of video signals including an interlaced stream consisting of segments of interlaced fields or a progressive stream consisting of progressive video frames;

during the interlaced stream, directing the interlaced fields to a deinterlacer, and directing an output of the deinterlacer to a single display device, the output of the deinterlacer being determined based on previously received interlaced fields from the video feeder;

during a transition of the stream of video signals from the interlaced stream to the progressive stream that corresponds to an end of an interlaced segment and a start of a progressive segment, directing the progressive video frames to a frame store and directing the output of the deinterlacer to the single display device; and during a progressive stream, directing the progressive video frames to the frame store, and directing previously stored frames from the frame store to the single display device.

18. The ABR server of claim 17, wherein:

the transition to the progressive stream comprises a period that one or more initial frames of a segment of video frames are received and directed to the frame store, the one or more processors are further configured to execute the one or more modules to direct, during a transition from the progressive stream to the interlaced stream, the interlaced fields to the deinterlacer, and directing previously stored frames from the frame store the display device, and the transition from the progressive stream to the interlaced stream comprises a period that one or more initial interlaced fields of a segment of interlaced fields are received and directed to the frame store.

19. The ABR server of claim 18, wherein:

directing the interlaced fields to a deinterlacer comprises storing the received interlaced fields in a field store, determining the output of the deinterlacer based on the previously received interlaced fields comprises at least one of a temporal or a spatial processing of the stored interlaced fields from the field store.

20. An adaptive bit rate (ABR) server comprising:

memory configured to store one or more program modules;

one or more processors coupled to the memory and configured to execute the one or more modules to perform the following:

receiving a stream of video signals from a feeder for displaying on a single display device, the stream of video signals including segments of one of interlaced fields or progressive video frames;

when receiving segments of interlaced fields from the feeder, directing using a video selector the interlaced fields to a deinterlacer that is included in the single display device;

when receiving segments of progressive video frames from the feeder, directing using the video selector, the segments of progressive video frames to a processor, and sending by the processor a selected group of lines of each progressive video frame to the single display device, wherein the selected group of lines alternates between odd-numbered lines and even-numbered lines for successively received video frames; and directing output signals of the deinterlacer to the single display device.

* * * * *